(12) United States Patent
Takeuchi et al.

(10) Patent No.: US 9,434,850 B2
(45) Date of Patent: Sep. 6, 2016

(54) INK JET PRINTING METHOD AND INK JET PRINTING APPARATUS

(71) Applicant: MIMAKI ENGINEERING CO., LTD., Nagano (JP)

(72) Inventors: Akira Takeuchi, Nagano (JP); Akihiro Tsukada, Nagano (JP); Takashi Namiki, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 74 days.

(21) Appl. No.: 14/375,437

(22) PCT Filed: Feb. 8, 2013

(86) PCT No.: PCT/JP2013/052998
§ 371 (c)(1),
(2) Date: Jul. 30, 2014

(87) PCT Pub. No.: WO2013/121994
PCT Pub. Date: Aug. 22, 2013

(65) Prior Publication Data
US 2014/0375734 A1  Dec. 25, 2014

(30) Foreign Application Priority Data
Feb. 14, 2012  (JP) .................. 2012-029980

(51) Int. Cl.
*B32B 3/02* (2006.01)
*C09D 11/30* (2014.01)
(Continued)

(52) U.S. Cl.
CPC ............... *C09D 11/30* (2013.01); *B41J 2/01* (2013.01); *B41J 11/002* (2013.01); *B41M 7/009* (2013.01); *C08L 33/00* (2013.01)

(58) Field of Classification Search
CPC ........ B41J 11/002; B41J 2/10; B41M 7/009; C09D 11/30; Y10T 428/24802; Y10T 29/49401
See application file for complete search history.

(56) References Cited

U.S. PATENT DOCUMENTS

| | | | |
|---|---|---|---|
| 2003/0083203 A1* | 5/2003 | Hashimoto | B41J 3/407 505/100 |
| 2005/0140764 A1* | 6/2005 | Chang | B41J 3/407 347/102 |
| 2014/0063154 A1* | 3/2014 | Gould | B41M 7/0081 347/96 |

FOREIGN PATENT DOCUMENTS

| | | |
|---|---|---|
| CN | 1652939 | 8/2005 |
| CN | 101544101 | 9/2009 |

(Continued)

OTHER PUBLICATIONS

"International Search Report (Form PCT/ISA/210) of PCT application", mailed on Mar. 5, 2013, with English translation thereof, p. 1-p. 4.

(Continued)

*Primary Examiner* — Elizabeth Mulvaney
(74) *Attorney, Agent, or Firm* — Jianq Chyun IP Office

(57) ABSTRACT

A printed material having excellent smoothness is provided even when a resin ink is used. An ink jet printing method uses an ink jet printing apparatus 1 including a head 5, and a printing platen 2 for heating a medium 100 from a back side of a surface of the medium 100, wherein the ink contains a solvent, a colorant and a resin, in which the resin is emulsionized or suspended. The ink jet printing method includes a drying step in which the ink is dried by the printing platen 2 after the ink is landed onto the medium 100.

9 Claims, 2 Drawing Sheets

(51) Int. Cl.
   *B41J 11/00*  (2006.01)
   *B41J 2/01*   (2006.01)
   *C08L 33/00*  (2006.01)
   *B41M 7/00*   (2006.01)

(56) References Cited

FOREIGN PATENT DOCUMENTS

| JP | 2009-226886 | 10/2009 |
| JP | 2010-030313 | 2/2010 |
| JP | 2012-000886 | 1/2012 |

OTHER PUBLICATIONS

"Office Action of Chinese Counterpart Application", issued on Apr. 1, 2015, with English translation thereof, pp. 1-17.

"Office Action of Japanese Counterpart Application", issued on Jun. 16, 2015, with English translation thereof, pp. 1-6.

"Office Action of Japanese Counterpart Application", issued on Oct. 20, 2015, with English translation thereof, pp. 1-2.

* cited by examiner

INK JET PRINTING METHOD AND INK JET PRINTING APPARATUS

CROSS-REFERENCE TO RELATED APPLICATION

This application is a 371 application of an International PCT application serial no. PCT/JP2013/052998, filed on Feb. 8, 2013, which claims the priority benefit of Japan application no. 2012-029980, filed on Feb. 14, 2012. The entirety of each of the above-mentioned patent applications is hereby incorporated by reference herein and made a part of this specification.

TECHNICAL FIELD

The present invention relates to an ink jet printing method and an ink jet printing apparatus.

BACKGROUND ART

Patent Literature 1 describes an ink jet recording apparatus having a recording head equipped with a drying unit.

CITATION LIST

Patent Literature

Patent Literature 1: JP-A-2012-886 (date of publication of unexamined patent application: Jan. 5, 2012)

SUMMARY OF INVENTION

Technical Problem

In the case where ink which contains a solvent such as water, and a resin, and in which the resin is emulsionized or suspended is used, when drying is carried out using the drying unit described in Patent Literature 1, a problem occurs that residual solvent is increased in a printed material, and smoothness of the printed material becomes worse.

The reason is as follows. That is, it is necessary to strongly heat and dry the landed ink from the upper surface thereof; in regard to the temperature distribution inside the landed ink, the temperature of the surface side is higher than that of the side of a recording medium, of course. Therefore, there is not much time during which a coating is formed on the surface of the ink immediately after the landing, and the solvent evaporates, and the surface is leveled (smoothed).

The present invention has been made in the light of the problems as described above, and it is an object of the present invention to provide a printed material in which residual solvent is reduced and which has excellent smoothness, even when an ink in which a resin is emulsionized or suspended is used.

Solution to Problem

An ink jet printing method according to the present invention using an ink jet printing apparatus including: a head provided with a nozzle for discharging an ink onto a recording medium, and a heating means for heating the recording medium from a back side of a surface of the recording medium, which faces a surface of the head on which the nozzle is provided, wherein the ink contains a solvent, a colorant and a resin, in which the resin is emulsionized or suspended. The ink jet printing method includes a drying step in which the ink is dried by the heating means after the ink is landed onto the recording medium.

The inventors found that when the ink which contains a solvent, a colorant and a resin, and in which the resin is emulsionized or suspended is used (hereinafter, referred to as "resin ink" for convenience of description), because the resin in the solvent is not dissolved in the solvent, unevenness is apt to be formed at the boundary between particles when the ink is landed and dried. In other words, the inventors found that when the resin ink is used, unevenness is apt to be formed as compared to an ink in which a resin is dissolved in the solvent.

On the other hand, the inventors found that when the temperature distribution inside the landed ink is confirmed when the recording medium onto which the resin ink is landed is heated from the back side of the surface onto which the ink is landed, the temperature of the recording medium side is higher than that of the surface of the ink. With this temperature distribution, it is possible to secure the time for surface leveling by gaining time until a coating is formed on the surface of the ink.

Further, since the solvent in the ink can be moved smoothly from the recording medium side to the surface side until a coating is formed on the surface, it is possible to reduce the amount of residual solvent in the printed material. That is, when the resin ink is dried by the technique in Patent Literature 1, the surface of the ink would be dried immediately after landing, and the solvent is likely to remain therein, but the present invention can prevent it.

In particular, since, in the case of the resin ink, the resin is not dissolved in the solvent, the solvent is confined between the resin particles, which tend to inhibit drying. However, in the present invention, the recording medium is heated from the back side of the surface onto which the ink is landed, and the solvent is moved smoothly from the recording medium toward the surface, thus, it is possible to carry out the drying efficiently, and to reduce residual solvent.

Therefore, even when the resin ink is used, it is possible to provide a printed material having excellent smoothness, to carry out drying efficiently, and to reduce residual solvent.

In the ink jet printing method according to the present invention, more preferably, the heating means is a mounting table on which the recording medium is placed.

Efficiency of heat conductivity is high because the heating means is brought into contact with the recording medium. Therefore, power saving can be achieved.

In the ink jet printing method according to the present invention, more preferably, the ink jet printing apparatus includes: a driving means for relatively moving the positions of the recording medium and the head; and a pre-heating table which is a mounting table on which the recording medium is heated in a position before the driving means causes the recording medium to move to a position where the recording medium faces the surface of the head on which the nozzle is provided.

Since the recording medium can be heated with the pre-heating table before printing, it is possible to lower the heating temperature by the heating means. Since the heating means is closer to the head than the pre-heating table, lowering the heating temperature can prevent the head from drying.

In the ink jet printing method according to the present invention, more preferably, the ink jet printing apparatus includes: a housing which includes the head therein, the housing further includes a blower for blowing outside air to the surface of the recording medium in the housing onto which the ink is landed, and, in the drying step, the blower blows air to the surface of the recording medium onto which the ink is landed.

The blower evaporates the solvent which moves from the recording medium side to the surface side of the ink, thus, it is possible to further improve the drying efficiency.

In the ink jet printing method according to the present invention, more preferably, the blower has no means for heating the recording medium.

It is possible to prevent that the time for surface leveling cannot be secured because of rapid drying of the surface of the ink. It is also possible to prevent that the solvent is confined in the ink layer because of rapid drying of the surface of the ink.

In the ink jet printing method according to the present invention, more preferably, the blower is provided on an opposite side to the position where the recording medium is placed as viewed from the head.

By placing the housing, heat generated from the heating means is apt to stay in the housing. The heat would rise upward in the housing. When the blower is provided on the opposite side to the position where the recording medium is placed as viewed from the head, the blower would be placed above the housing. Then, when the blower sends the heat that has risen back to the recording medium side, the heat can be utilized effectively to dry the ink landed onto the recording medium, and the heat can be prevented from staying around the head, thus, the head can be cooled.

In the ink jet printing method according to the present invention, more preferably, the resin is an acrylic resin.

In the ink jet printing method according to the present invention, more preferably, the ink jet apparatus includes: a driving means for relatively moving the positions of the recording medium and the head; an after-heating table for heating the recording medium from the back side of the surface onto which the ink is landed when the recording medium is located downstream from the heating means because of the movement by the driving means; and an after-heating means for heating the recording medium from the opposite side to the after-heating table across the recording medium, wherein a second drying step is included in which the recording medium is heated by the after-heating table and the after-heating means after the drying step.

Since the recording medium is dried on the heating means mainly from the back side of the surface onto which the ink is landed, the drying from the surface of the ink is sometimes insufficient. Therefore, the ink is dried by the after-heating table and the after-heating means from both sides of the recording medium again, thus, the ink on the recording medium can be dried more reliably.

In addition, the ink jet printing apparatus according to the present invention includes: a head provided with a nozzle for discharging ink onto a recording medium wherein the ink contains a solvent, a colorant and a resin, in which the resin is emulsionized or suspended; and a heating means for heating the recording medium from a back side of a surface of the recording medium, which faces a surface of the head on which the nozzle is provided.

As described above, even when resin ink is used, it is possible to provide a printed material having excellent smoothness, to carry out drying efficiently, and to reduce residual solvent.

Advantageous Effects of Invention

According to the present invention, there is an effect that it is possible to provide a printed material having excellent smoothness even when resin ink is used.

DESCRIPTION OF EMBODIMENTS

Hereafter, an ink jet printing method according to the present invention and an ink jet printing apparatus according to the present invention will be described in detail with reference to FIGS. 1 to 3. An ink jet printing apparatus 1 described below is an embodiment of an ink jet printing apparatus according to the present invention.

Figure 1:
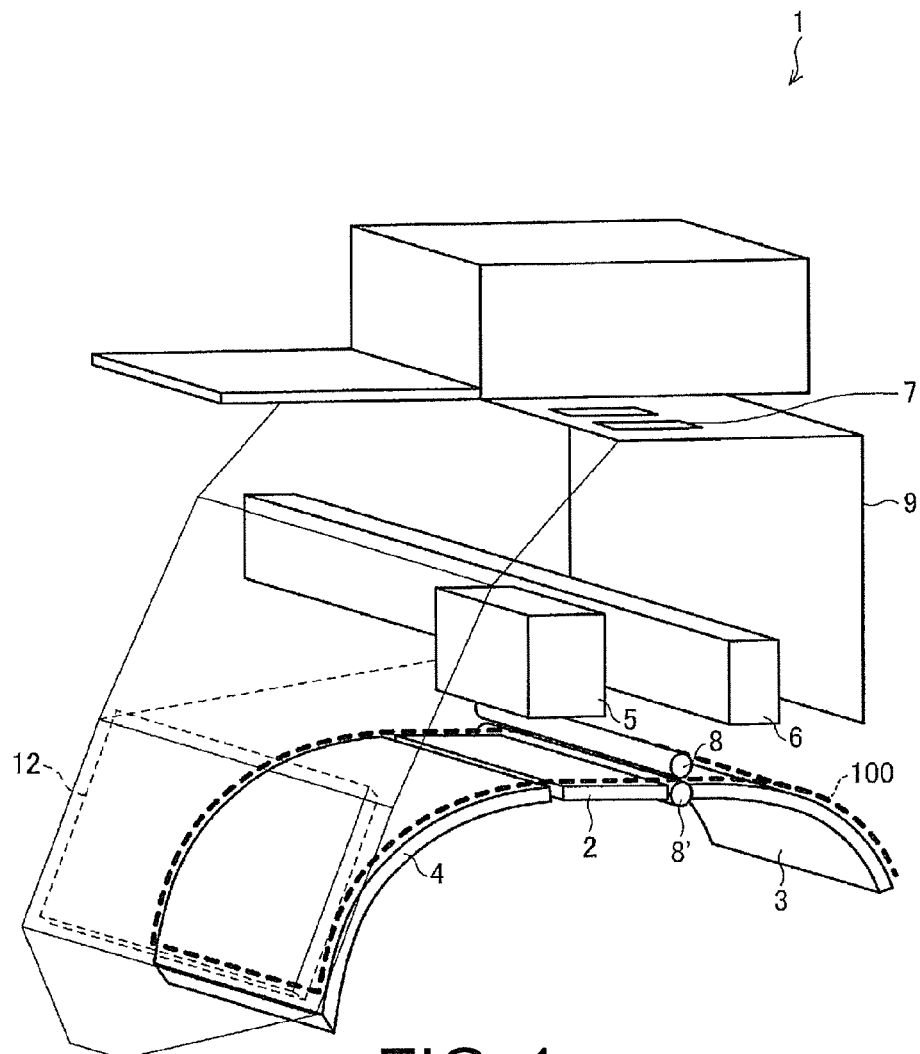
FIG. 1 is a diagram schematically showing an internal configuration of an ink jet printing apparatus 1 according to an embodiment of the present invention.

FIG. 1 is a diagram schematically showing an internal configuration of the ink jet printing apparatus 1. FIG. 2 is a cross-sectional view of the ink jet printing apparatus 1. FIG. 3 is an outline view of the ink jet printing apparatus 1.

Figure 2:
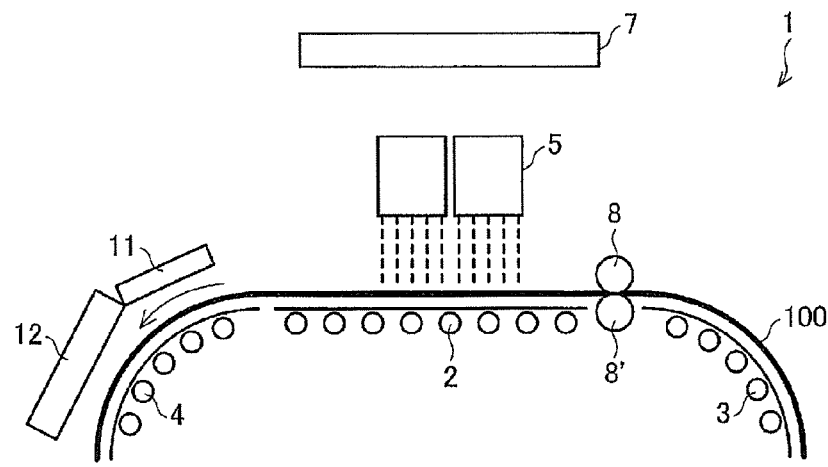
FIG. 2 is a cross-sectional view of the ink jet printing apparatus 1 according to an embodiment of the present invention.
Figure 3:
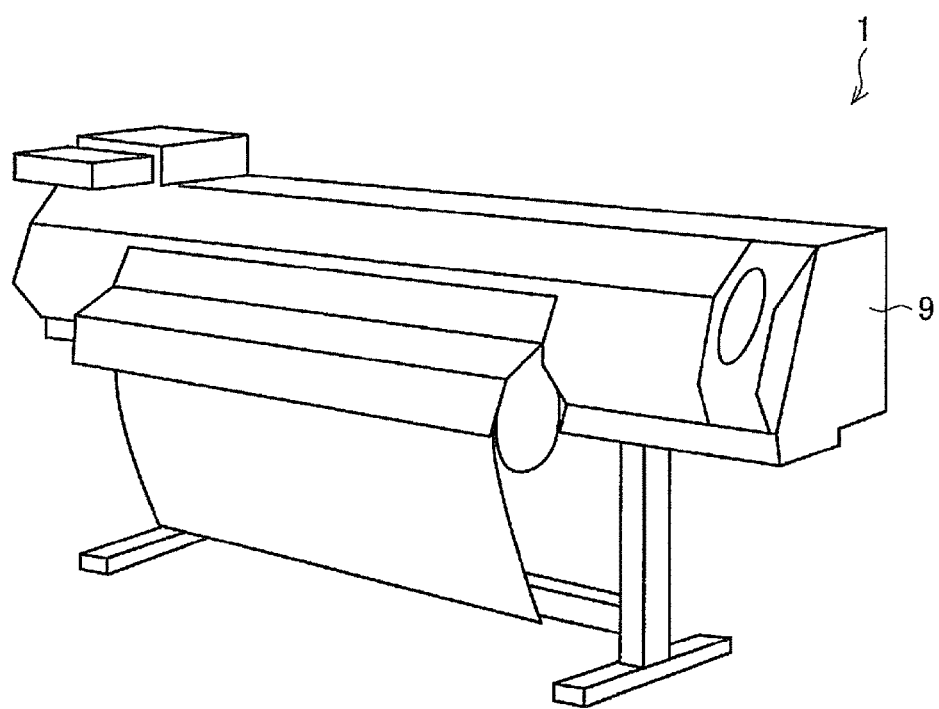
FIG. 3 is an outline view of the ink jet printing apparatus 1 according to an embodiment of the present invention.

As shown in FIGS. 1 to 3, the ink jet printing apparatus 1 includes a printing platen (heating means) 2, a pre-platen (pre-heating table) 3, an after-platen (after-heating table) 4, a head 5, a guide mechanism 6, a fan (blower) 7, a roller (driving means) 8, a driven roller 8' and a housing 9. Further, the ink jet printing apparatus 1 is an apparatus for discharging ink to a medium (recording medium) 100.

As an ink, a resin ink is used. The resin ink is an ink which contains a solvent, a colorant and a resin, and in which the resin is emulsionized or suspended.

In the resin ink used in the present invention, a resin is emulsionized or suspended in a solvent. For example, a solvent can be illustrated as water, a hydrophilic organic solvent and the like. If the resin is emulsionized or suspended in water, it can be also said that an aqueous emulsion or aqueous suspension is generated.

For examples, the resin can be illustrated as a water-soluble vinyl resin, an acrylic resin, an alkyd resin, a polyester resin, a polyurethane resin, a silicone resin, a fluorine resin, an epoxy resin, a phenoxy resin, a polyolefin resin and a modified resin thereof. Among these, an acrylic resin, a water-soluble polyurethane resin, a water-soluble polyester resin and a water-soluble acrylic resin are more preferable, and an acrylic resin is particularly preferable.

A coloring agent contained in the resin ink used in the present invention may be pigment or dye.

The specific configuration of pigment and dye is not particularly limited, and can be suitably selected depending on the usage of the ink or the like.

The printing platen 2 is used for heating the medium 100 from the back side of the surface of the medium 100 facing the surface on which a nozzle (not shown) of the head 5 is provided, and is also a table on which the medium 100 is placed. Therefore, since it is brought into contact with the medium 100, it has high thermal conductivity.

In the ink jet printing method according to the present invention, after the ink is landed onto the medium 100, the printing platen 2 dries the ink (drying step). Thus, even when the resin ink is used, it is possible to provide a printed material having excellent smoothness, to carry out drying efficiently, and to reduce residual solvent. The reason is as follows.

In the case where the resin ink is used, since a resin in a solvent (for example, water, a hydrophilic solvent) is not dissolved in the solvent, unevenness is formed at the boundary between the particles when it is landed and dried. In other words, when the resin ink is used, unevenness is apt to be formed as compared to the ink in which a resin is dissolved in the solvent.

On the other hand, the medium 100 onto which the resin ink is landed is heated from the back side of the surface onto which the ink is landed, so as to gain time until a coating is formed on the surface of the ink, thus it is possible to secure the time for surface leveling.

Further, since the solvent in the ink can be moved smoothly from the medium 100 side to the surface side until a coating is formed on the surface of the ink, it is possible to reduce the amount of residual solvent in the printed material. In particular, since, in the resin ink, the resin is not dissolved in the solvent, the solvent is confined between these resin particles, which is apt to inhibit the drying. However, in the present embodiment, the medium 100 is heated from the back side of the surface onto which the ink is landed, and the solvent is moved smoothly from the medium 100 toward the surface, thus, it is possible to carry out the drying efficiently, and to reduce residual solvent.

Therefore, even when the resin ink is used, it is possible to provide a printed material having excellent smoothness, to carry out drying efficiently, and to reduce residual solvent.

Further, the efficiency of heat conduction is high since the printing platen 2 is a mounting table for the medium 100 and is brought into contact with the medium 100. Therefore, power saving can be achieved.

The pre-platen 3 is a mounting table on which the medium 100 is heated when the medium 100 is placed in a position before it faces the surface of the head 5 on which the nozzle is provided. The pre-platen 3 is located on the upstream side in the flow of movement of the medium 100 as viewed from the printing platen 2.

Since the medium 100 can be heated with the pre-platen 3 before printing, it is possible to lower the heating temperature at the printing platen 2. Since the printing platen 2 is immediately below the head 5, lowering the heating temperature can prevent the head 5 from drying.

The after-platen 4 is for heating the medium 100 from the back side of the surface onto which the ink is landed when the medium 100 is located downstream from the printing platen 2 because of the movement by the driving roller 8, and is a mounting table for the medium 100 situated behind of the printing platen 2 in the movement direction by the driving roller 8. A heater or the like is integrated into the after-platen 4 to heat and dry the medium 100.

As shown in FIG. 2, a heater cover 11 and a drying fan heater (after-heating means) 12 are provided above the after-platen 4 so as to cover the medium 100.

The heater cover 11 is a cover for preventing the heat at the time when the after-platen 4 carries out drying from scattering. The heater cover 11 causes the heat at the time when the after-platen 4 carries out drying to be accumulated on the medium 100 for a longer period of time, allowing for sufficiently drying of the medium 100. Further, the heater cover 11 is also intended for causing heat of the hot air delivered by the drying fan heater 12 described below to stay on the medium 100.

The drying fan heater 12 is for heating the medium 100 from the opposite side to the after-platen 4 across the medium 100, and blows hot air to the medium 100 on the after-platen 4 to dry the ink on the medium 100. It is constituted by a heater and a fan, so that the fan blows air onto the medium 100 while the heater heats the air.

A second drying step is performed in which the after-platen 4 and the drying fan heater 12 heat the medium 100 for drying after the drying step by the printing platen 2 or the like. In the drying step, since the medium 100 is dried on the printing platen 2 mainly from the back side of the surface onto which the ink is landed, the drying from the surface of the ink is sometimes insufficient. Therefore, the ink is dried by the after-platen 4 and the drying fan heater 12 from both sides of the medium 100 again, thus, the ink on the medium 100 can be dried more reliably.

The head 5 is intended for discharging the resin ink onto the medium 100. A reservoir for the resin ink is provided in the head 5, and the resin ink in the reservoir is discharged onto the medium 100 from the nozzle (not shown).

The head 5 reciprocates on the medium 100 along the guide mechanism 6 for scanning. During the reciprocating movement, the head 5 discharges the resin ink to draw a picture, a character, or the like on the medium 100. For simplicity of explanation, in the present embodiment, only one head 5 is described, but two or more heads 5 may be used. In many cases, a plurality of heads 5 are provided, for example, and a staggered array or the like is formed to discharge an ink onto the medium 100.

The guide mechanism 6 is a guide for defining the direction of movement of the head 5. The head 5 is attached to the guide mechanism 6, and is reciprocated in the longitudinal direction of the guide mechanism 6.

The fan 7 is intended for blowing air outside the housing 9 to the surface of the medium 100 in the housing 9 onto which the ink is landed.

In the drying step, the fan 7 blows air to the surface of the medium 100 onto which the ink is landed. The fan 7 evaporates the solvent of the ink, in which the solvent moves from the medium 100 side to the surface side, thus, it is possible to further improve the drying efficiency.

The fan 7 has no means for heating the medium 100. That is, the fan 7 blows into the housing 9 the air outside the housing 9 at its temperature directly. Further, the fan 7 is provided on the opposite side to the position of the medium 100 as viewed from the head 5. That is, the fan 7 is located above the head 5 (the medium 100 is located below the head 5).

With such a configuration, it is possible to cool the head 5. This makes it possible to inhibit nozzle clogging because of the thermal storage of the head 5.

In addition, heat that is generated in the printing platen 2, and rises to the surface of the medium 100 can be sent back to the medium 100 side. Therefore, the heat generated by the printing platen 2 can be used effectively for drying the print surface. However, even though the heat generated by the printing platen 2 is used, drying by only blowing is mainly carried out at the fan 7, thus, resulting in a mild drying condition as compared to the drying means of a carriage provided with a heater as described in Patent Literature 1, therefore, ensuring the amount of evaporation of the solvent, and ensuring the surface leveling time are not inhibited. That is, it is different from the Patent Literature 1 in that mild drying is caused. Therefore, since drying in a drying area in the printing platen 2 is mild, in the present embodiment, the after-platen 4 and the drying fan heater 12 are provided, so as to improve drying characteristics in the drying area on the after-platen 4 corresponding to the downstream region of the printing platen 2. That is, in addition to the heating on the after-platen 4, strong drying is carried out by the drying fan heater 12 which is a combination of a heater and a fan toward the print surface of the medium from the upper side thereof. In regard to drying herein, leveling of the printing surface is already performed, and the solvent in the lower portion of the resin particles is moved to the surface side, thus, the solvent is less likely to remain even when it is heated strongly from the upper side of the print surface.

As described above, in one embodiment of the present invention, in a print area onto which an ink droplet is landed, drying in a drying area from the upper side of the print surface is carried out by only blowing by the fan without heating by a heater or the like so as to be absolutely mild drying, as well as the drying of the print surface is carried out by heating with the heating means below the recording medium, and drying characteristics in the drying area on the after-heating table is improved by the after-heating table and the after-heating means, thus, the present invention is superior to any conventional technology.

The driving roller 8 is intended for moving the medium 100. The driving roller 8 is disposed between the pre-platen 3 and the printing platen 2. The driving roller 8 is constituted by a roller.

Further, the driven roller 8' is intended for assisting the conveyance of the medium 100 by the driving roller 8. By driving the driving roller 8, the driven roller 8' is driven to rotate, thus the medium 100 is moved.

The housing 9 is a housing for including the head 5 therein. The housing 9 is provided so as to shut off from the outside the head 5 and the medium 100 in a position facing the surface of the head 5 on which the nozzle is provided.

Effects of the Present Embodiment

With the above configuration, the ink jet printing apparatus 1 can suitably implement the ink jet printing method according to the present invention. Specifically, a drying step is performed in which the printing platen 2 dries the ink after the ink is landed onto the medium 100, and the fan 7 blows air to the surface of the medium 100 onto which the ink is landed. Thus, even when the resin ink is used, a printed material having excellent smoothness and little residual solvent can be provided.

Further, in regard to drying in the drying step, as compared to the mild drying by only blowing by the printing platen 2 and the fan 7, a second drying step is performed in which the medium 100 is heated with the after-platen 4 and the drying fan heater 12 for stronger drying after the drying step. In this manner, the leveling time and movement time of the solvent to the surface side of the ink are secured, and then the ink is dried from both sides of the medium 100 in the drying step to improve the smoothness and reduce residual solvent, allowing for stronger drying of the ink on the medium 100.

The present invention is not limited to the embodiment described above, various modifications may be made within the scope of the claims, and embodiments obtained by combining technical means disclosed in the embodiment appropriately are also included in the technical scope of the present invention.

Supplementary Information

As described above, an embodiment of an ink jet printing method according to the present invention uses an ink jet printing apparatus 1. The ink jet printing apparatus 1 includes the head 5 provided with a nozzle for discharging ink onto the medium 100, and the printing platen 2 for heating the medium 100 from the back side of the surface of the medium 100, which faces the surface of the head 5 on which the nozzle is provided. The ink contains a solvent, a colorant and a resin, in which the resin is emulsionized or suspended. The ink jet printing method includes a drying step in which the ink is dried by the printing platen 2 after the ink is landed onto the medium 100.

In regard to the temperature distribution inside the landed ink when the medium 100 onto which the resin ink is landed is heated from the back side of the surface onto which the ink is landed, the temperature of the recording medium side is higher than that of the surface of the ink. With this temperature distribution, it is possible to secure the time for surface leveling by gaining time until a coating is formed on the surface of the ink.

Further, since the solvent in the ink can be moved smoothly from the medium 100 side to the surface side until a coating is formed on the surface, it is possible to reduce the amount of residual solvent in the printed material.

In particular, since, in the case of the resin ink, the resin is not dissolved in the solvent, the solvent is confined between the resin particles, which tend to inhibit drying. However, in the present embodiment, the medium 100 is heated from the back side of the surface onto which the ink is landed, and the solvent is moved smoothly from the medium 100 toward the surface, thus, it is possible to carry out the drying efficiently, and to reduce residual solvent.

Therefore, even when the resin ink is used, it is possible to provide a printed material having excellent smoothness, to carry out drying efficiently, and to reduce residual solvent.

In an embodiment of the ink jet printing method according to the present invention, the printing platen 2 is a mounting table on which the medium 100 is placed.

Efficiency of heat conductivity is high because the printing platen 2 is brought into contact with the medium 100. Therefore, power saving can be achieved.

In an embodiment of the ink jet printing method according to the present invention, the ink jet printing apparatus 1 includes the driving roller 8 for relatively moving the positions of the medium 100 and the head 5, and includes the pre-platen 3 which is a mounting table on which the medium 100 is heated when the medium 100 is placed in a position before the driving roller 8 causes the medium 100 to move to a position where it faces the surface of the head 5 on which the nozzle is provided.

Since the medium 100 can be heated with the pre-platen 3 before printing, it is possible to lower the heating temperature at the printing platen 2. Since the printing platen 2 is closer to the head 5 than the pre-platen 3, lowering the heating temperature can prevent the head 5 from drying.

In an embodiment of the ink jet printing method according to the present invention, the ink jet printing apparatus 1 includes the housing 9 which includes the head 5 therein. The housing 9 further includes the fan 7 for blowing outside air to the surface of the medium 100 in the housing 9 onto which the ink is landed, and, in the drying step, the fan 7 blows air to the surface of the medium 100 onto which the ink is landed.

The fan 7 evaporates the solvent of the ink, in which the solvent moves from the medium 100 side to the surface side, thus, it is possible to further improve the drying efficiency.

In an embodiment of the ink jet printing method according to the present invention, the fan 7 has no means for heating the medium 100.

It is possible to prevent that the time for surface leveling cannot be secured because of rapid drying of the surface of the ink. It is also possible to prevent that the solvent is confined in the ink layer because of rapid drying of the surface of the ink.

In an embodiment of the ink jet printing method according to the present invention, the fan 7 is provided on the opposite side to the position where the medium 100 is located as viewed from the head 5.

By placing the housing 9, heat generated from the printing platen 2 is apt to stay in the housing 9. The heat would rise upward in the housing 9. When the fan 7 is provided on the opposite side to the position where the medium 100 is placed as viewed from the head 5, the fan 7 would be placed above the housing 9. Then, when the fan 7 sends the heat that has risen back to the medium 100, the heat can be utilized effectively to dry the ink landed onto the medium 100, and the heat can be prevented from staying around the head 5, thus, the head can be cooled.

In an embodiment of the ink jet printing method according to the present invention, more preferably, the resin is an acrylic resin.

In an embodiment of the ink jet printing method according to the present invention, the ink jet printing apparatus 1 includes the driving roller 8 for relatively moving the positions of the medium 100 and the head 5, the after-platen 4 for heating the medium 100 from the back side of the surface onto which the ink is landed when the medium 100 is located downstream from the printing platen 2 because of the movement by the driving roller 8, and the drying fan heater 12 for heating the medium 100 from the opposite side to the after-platen 4 across the medium 100, and a second drying step is included in which the medium 100 is heated by the after-platen 4 and the drying fan heater 12 after the drying step.

Since the medium 100 is dried on the printing platen 2 mainly from the back side of the surface onto which the ink is landed, the drying from the surface of the ink is sometimes insufficient. Therefore, the ink is dried by the after-platen 4 and the drying fan heater 12 from both sides of the medium 100 again, thus, the ink on the medium 100 can be dried more reliably.

In addition, the ink jet printing apparatus 1 includes the head 5 provided with a nozzle for discharging ink onto the medium 100 wherein the ink contains a solvent, a colorant and a resin, in which the resin is emulsionized or suspended, and the printing platen 2 for heating the medium 100 from the back side of the surface of the medium 100, which faces the surface of the head 5 on which the nozzle is provided, As described above, even when resin ink is used, it is possible to provide a printed material having excellent smoothness, to carry out drying efficiently, and to reduce residual solvent.

INDUSTRIAL APPLICABILITY

The present invention may be utilized in ink jet printing.

The invention claimed is:

1. An ink jet printing method using an ink jet printing apparatus comprising a head provided with a nozzle for discharging an ink onto a recording medium, and a heating means for heating the recording medium from a back side of a surface of the recording medium, which faces a surface of the head on which the nozzle is provided,
wherein the ink contains a solvent, a colorant and a resin, in which the resin is emulsionized or suspended, and the ink is dried to form a coating,
the ink jet printing method comprising:
a drying step, in which the ink is dried by the heating means after the ink is landed on the recording medium; and
an after-heating step, for heating the recording medium from the back side of the surface onto which the ink is landed at a downstream position from the heating means;
wherein the ink jet printing apparatus further comprises:
a blower, being disposed above the heating means and the blower blows an air to the surface of the recording medium onto which the ink is landed;
wherein the blower has no means for heating the air.

2. The ink jet printing method according to claim 1, wherein the heating means is a mounting table on which the recording medium is placed.

3. The ink jet printing method according to claim 1, wherein the ink jet printing apparatus further comprises:
a driving means for relatively moving the positions of the recording medium and the head; and
a pre-heating table which is a mounting table on which the recording medium is heated, when the recording medium is placed in a position before the driving means causes the recording medium to move to a position where the recording medium faces the surface of the head on which the nozzle is provided.

4. The ink jet printing method according to claim 1, wherein the ink jet printing apparatus further comprises:
a housing which includes the head therein, the housing further comprises a blower for blowing outside air to the surface of the recording medium in the housing onto which the ink is landed, and
in the drying step, the blower blows air to the surface of the recording medium onto which the ink is landed.

5. The ink jet printing method according to claim 4, wherein the blower has no means for heating the recording medium.

6. The ink jet printing method according to claim 4, wherein the blower is provided on an opposite side to the position where the recording medium is placed as viewed from the head.

7. The ink jet printing method according to claim 1, wherein the resin is an acrylic resin.

8. The ink jet printing method according to claim 1, wherein the ink jet apparatus further comprises:
a driving means for relatively moving the positions of the recording medium and the head;
an after-heating table for heating the recording medium from the back side of the surface onto which the ink is landed when the recording medium is located downstream from the heating means because of the movement by the driving means; and
an after-heating means for heating the recording medium from the opposite side to the after-heating table across the recording medium,
wherein a second drying step is included in which the recording medium is heated by the after-heating table and the after-heating means after the drying step.

9. An ink jet printing apparatus, comprising:
a head provided with a nozzle for discharging an ink onto a recording medium, wherein the ink contains a solvent, a colorant and a resin, in which the resin is emulsionized or suspended, and the ink is dried to form a coating;

a heating means for heating the recording medium from a back side of a surface of the recording medium, which faces a surface of the head on which the nozzle is provided;

an after-heating means, for heating the recording medium from the back side of the surface onto which the ink is landed at a downstream position from the heating means; and a blower, being disposed above the heating means and the blower blows an air to the surface of the recording medium onto which the ink is landed;

wherein the blower has no means for heating the air.

* * * * *